(12) United States Patent
Feigel et al.

(10) Patent No.: US 9,446,753 B2
(45) Date of Patent: Sep. 20, 2016

(54) BRAKE ACTUATING UNIT

(75) Inventors: Hans-Jörg Feigel, Rosbach (DE);
Kristjan Tarandek, Neu Isenburg (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/238,972

(22) PCT Filed: Aug. 7, 2012

(86) PCT No.: PCT/EP2012/065404
§ 371 (c)(1),
(2), (4) Date: Feb. 14, 2014

(87) PCT Pub. No.: WO2013/023953
PCT Pub. Date: Feb. 21, 2013

(65) Prior Publication Data
US 2014/0216866 A1 Aug. 7, 2014

(30) Foreign Application Priority Data

Aug. 15, 2011 (DE) .......................... 10 2011 080 957
Aug. 26, 2011 (DE) .......................... 10 2011 081 656
Jul. 27, 2012 (DE) .......................... 10 2012 213 216

(51) Int. Cl.
*B60T 8/36* (2006.01)
*B60T 17/00* (2006.01)
(Continued)

(52) U.S. Cl.
CPC ............... *B60T 17/00* (2013.01); *B60T 7/042* (2013.01); *B60T 8/368* (2013.01); *B60T 8/4081* (2013.01); *B60T 13/66* (2013.01); *B60T 13/745* (2013.01);
(Continued)

(58) Field of Classification Search
CPC .... B60T 7/042; B60T 2220/04; B60T 8/368; B60T 8/4081; B60T 13/66
See application file for complete search history.

(56) References Cited

U.S. PATENT DOCUMENTS 6,203,119 B1 * 3/2001 Towers et al. ............. 303/114.1
6,305,758 B1 10/2001 Hageman et al.
(Continued)

FOREIGN PATENT DOCUMENTS

DE          43 16 582 A1    11/1994
DE    10 2009 033 499 A1     1/2010
(Continued)

OTHER PUBLICATIONS

PCT International Search Report—Jan. 23, 2013.

*Primary Examiner* — Thomas Irvin
(74) *Attorney, Agent, or Firm* — Brinks Gilson & Lione (57) ABSTRACT

A brake actuating unit (1, 1') for a brake-by-wire motor vehicle brake system having a housing (10), a first hydraulic cylinder/piston arrangement (3) to which a plurality of wheel brakes connectable. The piston being operable by a push rod (2) transmitting an actuating force, an electrically controllable pressure supplying device (6) in the form of a second hydraulic cylinder/piston arrangement (12), actuated by an electric motor (7). A number of valves (41, 42, 43) for setting wheel-individual brake pressures and for disconnecting or connecting the wheel brakes with the first or the second cylinder/piston arrangement (3, 12). The valves and the second cylinder/piston arrangement are arranged at least partially inside the housing (10), the axis of the electric motor (7) being arranged substantially perpendicular to the longitudinal axis (30) of the first cylinder/piston arrangement (3).

21 Claims, 4 Drawing Sheets

(51) Int. Cl.
  *B60T 7/04*     (2006.01)
  *B60T 8/40*     (2006.01)
  *B60T 13/74*    (2006.01)
  *B60T 13/66*    (2006.01)

(52) U.S. Cl.
  CPC ......... *B60T 2220/04* (2013.01); *B60T 2270/82* (2013.01); *B60T 2270/88* (2013.01)

(56) References Cited

U.S. PATENT DOCUMENTS

| | | | |
|---|---|---|---|
| 8,424,976 B2* | 4/2013 | Dinkel et al. | 303/3 |
| 8,914,191 B2* | 12/2014 | Bohn | 701/36 |
| 8,979,218 B2* | 3/2015 | Drumm | 303/114.1 |
| 2008/0179941 A1 | 7/2008 | Matsushita | |
| 2008/0257670 A1* | 10/2008 | Drumm et al. | 188/358 |
| 2008/0265665 A1* | 10/2008 | Drumm | 303/116.4 |
| 2010/0225159 A1* | 9/2010 | Drumm | 303/20 |
| 2011/0115282 A1* | 5/2011 | Dinkel et al. | 303/3 |
| 2014/0028084 A1* | 1/2014 | Biller et al. | 303/9.62 |
| 2014/0110997 A1* | 4/2014 | Biller et al. | 303/9.62 |
| 2014/0203626 A1* | 7/2014 | Biller et al. | 303/10 |

FOREIGN PATENT DOCUMENTS

| | | |
|---|---|---|
| DE | 10 2009 019 802 A1 | 11/2010 |
| DE | 10 2010 040 097 A1 | 3/2011 |
| DE | 10 2010 003 081 A1 | 8/2011 |
| DE | 10 2010 003 082 A1 | 8/2011 |
| JP | 8-282459 | 10/1996 |
| JP | 10-329698 | 12/1998 |
| JP | 2007-269297 | 10/2007 |
| JP | 2008-184057 | 8/2008 |
| JP | 2014-525875 | 10/2014 |
| SU | 1369953 A1 | 1/1988 |
| SU | 1449003 A3 | 12/1988 |
| WO | WO 01/08952 A1 | 2/2001 |

\* cited by examiner

BRAKE ACTUATING UNIT

CROSS REFERENCE TO RELATED APPLICATIONS

This application claims priority to German Patent Application Nos. 19 2911 080 957.0, filed Aug. 15, 2011; 10 2011 081 656.9, filed Aug. 26, 2011; 10 213 216.3, filed Jul. 27, 2012; and PCT/EP2012/065404, filed Aug. 7, 2012.

FIELD OF THE INVENTION

The invention relates to a brake actuating unit and to a brake system having such a brake actuating unit.

BACKGROUND

Known from DE 10 2010 040 097 A1 is a brake system for motor vehicles comprising a brake pedal for actuating a pedal decoupling unit with a brake master cylinder, an electro-hydraulic pressure supplying device in the form of a hydraulic cylinder/piston arrangement, the piston of which can be actuated by an electric motor via an interposed rotational-translational gear mechanism, and a pressure modulation unit having an inlet valve and outlet valve per wheel brake for setting wheel-individual brake pressures. In this case the brake system has a modular structure; that is to say that the brake master cylinder is arranged in a first module, the pressure supplying device is arranged in a second module and the valves for modulating brake pressure and the valves for disconnecting and connecting the wheel brakes from/to the brake master cylinder or from/to the pressure supplying device are arranged in a third module. All the modules are implemented as independent units. In the brake system the axis of the electric motor, the longitudinal axis of the pressure supplying device and the longitudinal axis of the brake master cylinder are arranged parallel to one another.

It is the object of the present invention to provide a compact brake actuating unit for a brake-by-wire brake system for motor vehicles.

This object is achieved according to the invention by a brake actuating unit as described and claimed herein.

SUMMARY AND INTRODUCTORY DESCRIPTION OF THE INVENTION

The invention is based on the concept of arranging the first cylinder/piston arrangement actuatable by the vehicle driver, the pressure supplying device and the valve arrangement in the same housing, the axis of the electric motor of the pressure supplying device being arranged substantially perpendicular to the longitudinal axis of the first cylinder/piston arrangement.

An advantage of the invention lies in a compact integration of brake actuation and brake pressure modulation in one module. Weight saving, simple manufacturability and good connectability of electrical and hydraulic connections are thereby made possible. Furthermore, the orthogonal arrangement enables a short overall length of the brake actuating unit to be achieved, which is advantageous for good characteristics in a crash situation. The compact, integrated arrangement also makes possible improved possibilities of adapting the brake actuating unit to very diverse vehicle packagings.

The longitudinal axis of the second cylinder/piston arrangement of the pressure supplying device is also preferably arranged substantially perpendicular to the longitudinal axis of the first cylinder/piston arrangement. It can thereby be achieved that the extension of the housing in the direction of travel (direction of the longitudinal axis of the first cylinder/piston arrangement) is determined substantially by the minimum length of the first cylinder/piston arrangement, and does not substantially exceed said minimum length. Especially preferably, the axes of the electric motor and of the second cylinder/piston arrangement are arranged in alignment. A further gear mechanism, for example a rotational-rotational gear in addition to the rotational-translational gear of the pressure supplying device, is then unnecessary.

According to a development of the invention, the brake actuating unit includes a simulation device which communicates an agreeable brake pedal feel to the vehicle driver in the brake-by-wire mode, this brake pedal simulator being arranged at least partially in the housing. The longitudinal axis of the brake pedal feel simulator is arranged substantially perpendicular to the longitudinal axis of the second cylinder/piston arrangement in order to obtain a compact structure. Especially preferably, the brake pedal feel simulator is implemented hydraulically and includes a third cylinder/piston arrangement having at least one simulator piston. The effect of the brake pedal feel simulator can advantageously be switched on and off by means of a simulator release valve.

The hydraulic connections of the brake actuating unit are preferably arranged on the same lateral face of the housing of the brake actuating unit on which the electric motor is arranged. By arranging the hydraulic connections and the electric motor perpendicularly to the longitudinal axis of the first cylinder/piston arrangement, the space requirement for the installed brake actuating unit in the direction of travel is less.

According to a preferred embodiment of the brake actuating unit according to the invention, it includes a brake pedal actuation travel detecting device which is also integrated at least partially in the housing. The brake pedal actuation travel detecting device is especially preferably formed by a travel sensor which detects the travel of the actuating piston.

The brake actuating unit preferably includes a pressure sensor which detects the pressure of the first cylinder/piston arrangement and a further pressure sensor which detects the pressure of the pressure supplying device, the pressure sensors also being integrated at least partially in the housing.

The electric motor is preferably fastened to a first lateral face of the housing, the axis of the electric motor being arranged substantially perpendicular to the first lateral face. Consequently, the first lateral face is oriented approximately parallel to the longitudinal axis of the first cylinder/piston arrangement. Especially preferably, the size of the first lateral face is dimensioned such that the electric motor, or its fastening side, can be completely sealed to the first lateral face of the housing. Because the hydraulic connections of the brake actuating unit are preferably arranged on the same lateral face of the housing of the brake actuating unit as the electric motor in order to minimize the space requirement of the brake actuating unit, the hydraulic connections, for example for connecting the wheel brakes, are advantageously arranged on the first lateral face.

According to a preferred embodiment of the brake actuating unit according to the invention, the valve arrangement is arranged on a second lateral face of the housing opposite the electric motor.

The brake pedal actuation travel detecting device and/or the pressure sensors is/are preferably arranged on the second lateral face.

An electronic control and regulating unit having a control unit housing arranged on the second lateral face opposite the electric motor is preferably provided in order to make possible a simple electrical or magnetic connection between the valve arrangement and/or the brake pedal actuation travel detecting device and/or the pressure sensors and the electronic control and regulating unit. The control unit housing therefore especially preferably covers at least a portion of the valve arrangement and/or of the brake pedal actuation travel detecting device and/or of the pressure sensors. The control unit housing preferably extends beyond the second lateral face of the housing in at least one direction in order to make possible the space-saving attachment of an electrical connecting element.

The electronic control and regulating unit preferably serves to activate the pressure supplying device and the valve arrangement, for which reason the output signals of the pressure sensors and of the brake pedal actuation travel detecting device are especially preferably supplied to the electronic control and regulating unit.

The electrical connections between the pressure supplying device, in particular the electric motor, and the electronic control and regulating unit preferably pass through the housing.

According to a preferred embodiment of the brake actuating unit according to the invention, at least one electrical connecting element is arranged, advantageously injection-molded, on the control unit housing and extends adjacent to a third lateral face of the housing opposite the push rod. This arrangement of the connecting element is space-saving and makes possible an electrical connection, for example by a plug-in connector, parallel to the third lateral face, and therefore in front of the housing in the direction of travel. Especially preferably, the electrical connecting element extends parallel to the axis of the electric motor, since sufficient access to the brake actuating unit is available in this direction because of the electric motor.

A pressure medium reservoir under atmospheric pressure is preferably fastened directly to a fourth lateral face of the housing. Alternatively, a hydraulic connection for a pressure medium reservoir under atmospheric pressure is provided on the fourth lateral face of the housing.

According to a development of the invention, a further electrical connecting element, which serves especially preferably to supply electrical energy to the electronic control and regulating unit, is arranged on the control unit housing and extends between the housing and the pressure medium reservoir. The connecting element therefore advantageously extends adjacent to the fourth lateral face of the housing. The connecting element is thereby arranged in a space-saving manner and is protected by the housing and the pressure medium reservoir. In order to achieve a still smaller brake actuating unit, a recess through which the connecting element can pass is provided in the housing and/or in the pressure medium reservoir. The further electrical connecting element also extends especially preferably parallel to the axis of the electric motor. Alternatively, it is preferred that the further connecting element extends through the housing or through the pressure medium reservoir.

In order to keep the extension of the brake actuating unit as small as possible in the direction perpendicular to the longitudinal axis of the first cylinder/piston arrangement, the second cylinder/piston arrangement of the pressure supplying device preferably projects at least partially from the housing. Especially preferably, the projecting portion of the second cylinder/piston arrangement is covered by the control unit housing or extends through the control unit housing, whereby the required overall installation space is again reduced.

For simple attachment of the brake actuating unit to the motor vehicle, the housing of the brake actuating unit preferably includes on its lateral face on the push-rod side a fastening element, advantageously a fastening plate, by means of which the housing can be fastened mechanically to a bulkhead of the motor vehicle.

The invention also relates to a brake system having a brake actuating unit according to the invention. The brake actuating unit is preferably used in a brake system for motor vehicles which, in a brake-by-wire mode, can be activated both by the vehicle driver and independently of the vehicle driver, is preferably operated in the brake-by-wire mode and can be operated in at least one fall-back mode in which only operation by the vehicle driver is possible.

BRIEF DESCRIPTION OF THE DRAWINGS

Further preferred embodiments of the invention are apparent from the following description with reference to schematic figures in which.

FURTHER DESCRIPTION OF THE INVENTION

Figure 1:
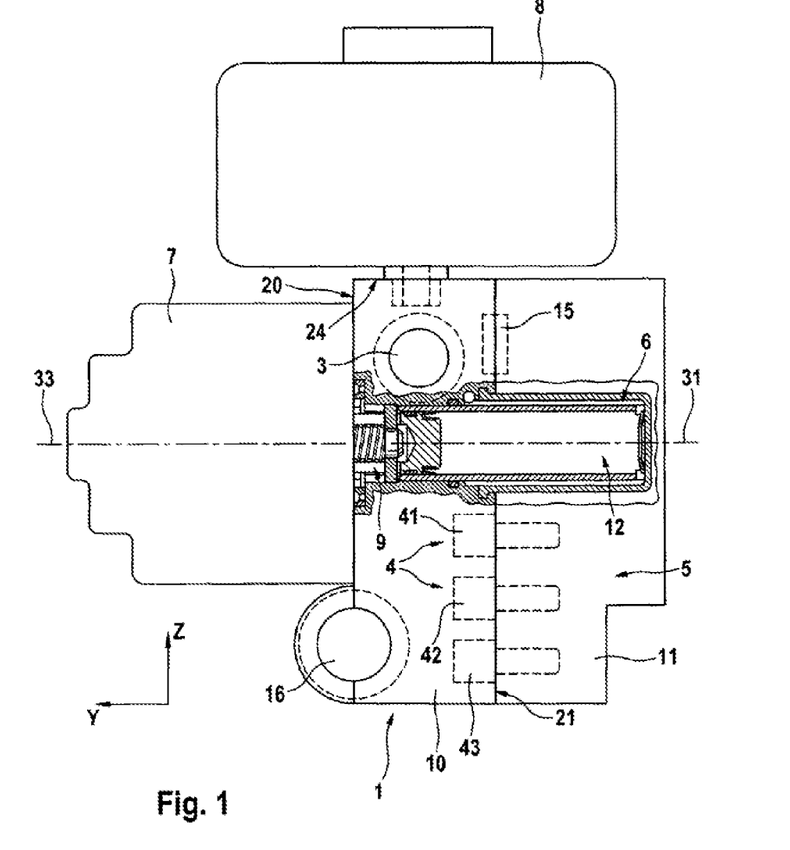
FIG. 1 shows a first exemplary embodiment of a brake actuating unit according to the invention in a first view.
Figure 2:
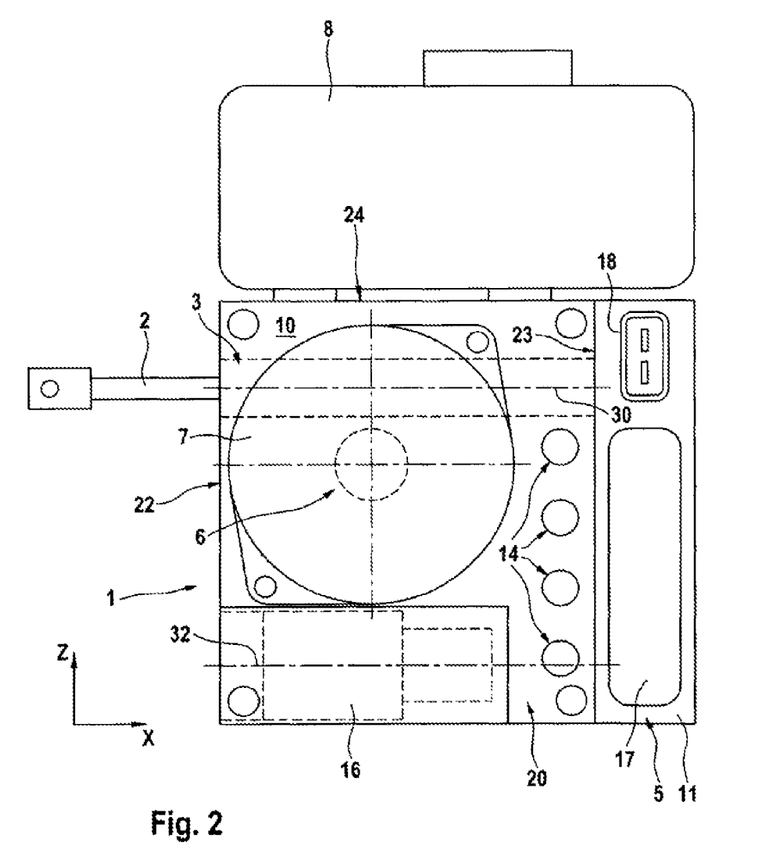
FIG. 2 shows the first exemplary embodiment of FIG. 1 in a second view perpendicular to the first view.

FIGS. 1 and 2 represent schematically a first exemplary embodiment of a brake actuating unit according to the invention for a motor vehicle brake system of the brake-by-wire type. The brake actuating unit 1 comprises a hydraulic cylinder/piston arrangement 3 which can be actuated by a vehicle driver by means of a push rod (pedal rod) 2 and has an actuating piston (not shown) which is guided displaceably in the housing 10 of the brake actuating unit along the longitudinal axis 30 of the first cylinder/piston arrangement and delimits a hydraulic pressure chamber to which wheel brakes (not shown) of the motor vehicle brake system can be attached by means of hydraulic connections. The cylinder/piston arrangement 3 is, for example, a tandem master cylinder. The cylinder/piston arrangement 3 serves, for example, to enable pressure to be applied to the wheel brakes by the driver in a fall-back mode of the brake system in which the wheel brakes are hydraulically connected to the pressure chamber of the cylinder/piston arrangement 3. The longitudinal axis 30 is arranged substantially parallel to the direction of travel X of the motor vehicle.

An electrically controllable pressure supplying device 6, in the form of a second hydraulic cylinder/piston arrangement 12, is arranged at least partially inside the housing 10, the piston of which cylinder/piston arrangement 12 is displaceable by an electric motor 7 by means of a rotational-translational gear mechanism 9 along the longitudinal axis 31 of the second cylinder/piston arrangement 12. In a brake-by-wire mode of the brake system, the wheel brakes can be actuated by means of the pressure of the pressure supplying device 6. For this purpose the electric motor 7 can be activated according to a brake pedal actuation. The electromechanical actuator having electric motor 7 and rotational-translational gear mechanism 9 effects a translational movement of the piston of the second cylinder/piston arrangement 12. In the example, the gear mechanism 9 is in the form of a ball screw drive or roller screw drive.

Furthermore, a valve arrangement 4 comprising a plurality of valves 41, 42, 43 is arranged at least partially in the housing 10, by means of which valve arrangement 4 wheel-individual brake pressures can be set and can be disconnected or connected from/to the first cylinder/piston arrangement 3 or from/to the pressure supplying device 6.

The first cylinder/piston arrangement 3, the valve arrangement 4 and the pressure supplying device 6 are arranged wholly or at least partially inside the single common housing 10, the axis 33 of the electric motor 7 of the pressure supplying device 6 being arranged perpendicularly or approximately perpendicularly to the longitudinal axis 30 of the first cylinder/piston arrangement 3.

The electric motor 7 is fastened to the housing 10 directly to the lateral face 20 of the housing 10. The minimum extension of the lateral face 20 is configured such that the fastening end face of the electric motor 7 can be completely sealed to the housing 10.

The axis 31 of the second cylinder/piston arrangement 12 is also arranged orthogonally or approximately orthogonally to the longitudinal axis 30 of the first cylinder/piston arrangement 3, that is, along the direction Y. In the example, the axis 33 of the electric motor 7 and the axis 31 of the second cylinder/piston arrangement are arranged in alignment.

The brake actuating unit 1 further includes an electronic control and regulating unit 5 (ECU) having a control unit housing 11, and a pressure medium reservoir (brake fluid container) 8 under atmospheric pressure.

The pressure medium reservoir 8 may be fastened directly to the housing 10. Alternatively, at least one connection for the pressure medium reservoir 8 may be arranged on the housing 10. The pressure medium reservoir 8 or the connections for the pressure medium reservoir 8 is/are advantageously arranged on the upper lateral face 24 (in the Z direction above the lateral faces 20, 21, 22, 23) of the housing 10.

The electronic control and regulating unit 5 serves to activate the pressure supplying device 6 and the valve arrangement 4 and is arranged on the lateral face 21 of the housing 10 opposite the electric motor 7. The electrical connections between the electric motor 7 and the control and regulating unit 5, for example for activating the electric motor or for transmitting (sensor) signals, advantageously extend through the housing 10 in order to protect the electrical connections.

The valve arrangement 4 is advantageously also arranged on the side 21 of the housing 10 opposite the electric motor 7, so that a simple electrical or magnetic connection between the valve arrangement 4 and the control and regulating unit 5 is possible. The whole or at least a part of the valve arrangement 4 is covered by the control unit housing 11.

In order to detect brake pedal actuation, the brake actuating unit 1 includes a travel sensing arrangement (brake pedal actuation travel detecting device) 15 (for example, a travel or position sensor) for detecting the actuation of the brake pedal or of the push rod 2 or of the first cylinder/piston arrangement 3. The sensing arrangement 15 is advantageously integrated wholly or partially in the housing 10 and arranged on the lateral face 21 of the housing 10. This makes possible a simple electrical or magnetic connection between the travel sensing arrangement 15 and the control and regulating unit 5. The travel sensing arrangement 15 is covered, for example, by the control unit housing 11.

In addition, a pressure sensing arrangement (not shown) is arranged on the housing 10. The pressure sensing arrangement includes, for example, at least one pressure sensor for detecting a pressure of the first cylinder/piston arrangement 3 and a pressure sensor for detecting a pressure of the pressure supplying device 6. Further pressure sensors for detecting the pressures in the brake circuits or wheel brake circuits are optionally present. The pressure sensors are advantageously arranged parallel between the valves 41, 42, 43 of the valve arrangement 4. In addition, the pressure sensing arrangement is advantageously covered by the control unit housing 11.

Furthermore, the brake actuating unit 1 also includes a travel sensing arrangement (for example, a travel or position or angle sensor, not shown) for detecting a position of the electric motor 7 or of the piston of the second cylinder/piston arrangement 12. For example, a rotor position sensor serving to detect the rotor position of the electric motor 7 is provided. This travel sensing arrangement is also integrated wholly or partially in the housing 10 and is arranged on the lateral face 21 of the housing 10. The travel sensing arrangement is advantageously covered by the control unit housing 11.

The output signals of the pressure sensing arrangement, of the brake pedal actuation travel detecting device 15 and of the rotor position sensor are supplied to the control and regulating unit 5.

The housing 10 has an adapter plate (not shown) for the mechanical attachment to the bulkhead, in the example on the lateral face 22 of the housing 10 on the push-rod side. The first cylinder/piston arrangement 3 extending in the travel direction X inside the housing 10 is therefore disposed orthogonally or approximately orthogonally to the bulkhead of the vehicle in the installed state of the brake actuating unit 1.

In the example, a portion of the cylinder/piston arrangement 12 of the pressure supplying device 6 projects from the housing 10 and is covered by the control unit housing 11, whereby a further reduction in installation space is achieved. Alternatively, the cylinder/piston arrangement 12 may also extend through the control unit housing 11.

The hydraulic connections 14 of the brake actuating unit 1, for example for the connections to the wheel brakes, are arranged on the lateral face 20 of the housing on which the electric motor 7 is also arranged. In this position, therefore, the hydraulic connections 14 do not lead to any significantly greater installation space requirement of the brake actuating unit in the Y direction.

The electronic control and regulating unit 5 with its control unit housing 11 is arranged on the lateral face 21 of the housing 10. In the example, the control unit housing 11 extends beyond the lateral face 21 in the X direction.

One or more electrical connecting elements 17, 18 is/are arranged, for example by injection molding, on the control and regulating unit 5 or on the housing 11 thereof. In the example the connecting elements are in the form of sockets 17, 18 for receiving corresponding plug-in elements. The electrical connecting elements 17, 18 are arranged in the example on the region of the control unit housing 11 extending beyond the lateral face 21. The electrical connector 17 serves, for example, to connect a data or bus connection for signal transmission to another control unit or to connect to a CAN bus. The connecting element 18 is suitable, for example, for supplying electrical current to the control and regulating unit 5.

In the example, the connecting elements 17, 18 are to be plugged into the correspondingly projecting housing 11 of the control device 5 in front of the housing 10 (in the travel direction X). The plug-in direction of the connecting elements 17, 18 is aligned in a direction parallel to the electric motor axis 33 (Y direction). The connecting elements 17, 18, are therefore arranged beside the lateral face 23 and below the brake fluid reservoir 8, and the plug-in direction is parallel to the lateral face 23 (facing towards the viewer in FIG. 2).

The brake actuating module 1 advantageously includes a brake pedal feel simulator 16 which communicates an agreeable brake pedal feel to the vehicle driver in the brake-by-wire mode. The brake pedal feel simulator 16 extends wholly or partially inside the housing 10. Alternatively, the brake pedal feel simulator may be configured as an independent module which can be attached to the housing 10. In the example, the longitudinal axis 32 of the brake pedal feel simulator 16 is arranged substantially perpendicular to the longitudinal axis 31 of the second cylinder/piston arrangement 12 and parallel to the longitudinal axis 30 of the first cylinder/piston arrangement 3.

The brake pedal feel simulator 16 is advantageously implemented hydraulically with at least one simulator piston guided displaceably in a cylinder. For example, the brake pedal feel simulator 16 includes at least one simulator piston, a hydraulic simulator chamber which is connected or connectable to a pressure chamber of the first cylinder/piston arrangement 3, and an elastic element (for example, a spring).

The effect of the brake pedal feel simulator 16 can advantageously be switched on and off by means of a simulator release valve.

As a result of the exemplary arrangement of cylinder/piston arrangement 3, pressure supplying device 6, valve arrangement 4, control and regulating unit 5, hydraulic connections 14 and electrical connecting elements 17, 18, the maximum extension of the housing 10 in the travel direction (direction X) is determined substantially by the minimum length of the cylinder/piston arrangement 3.

Figure 3:
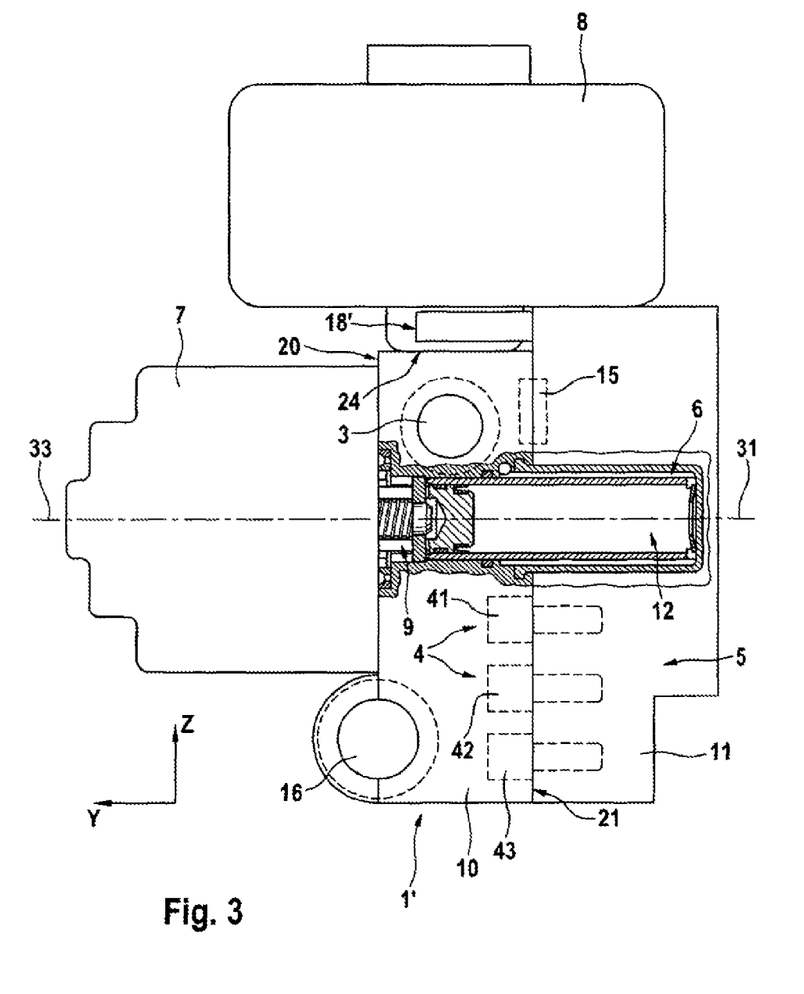
FIG. 3 shows a second exemplary embodiment of a brake actuating unit according to the invention in a first view.
Figure 4:
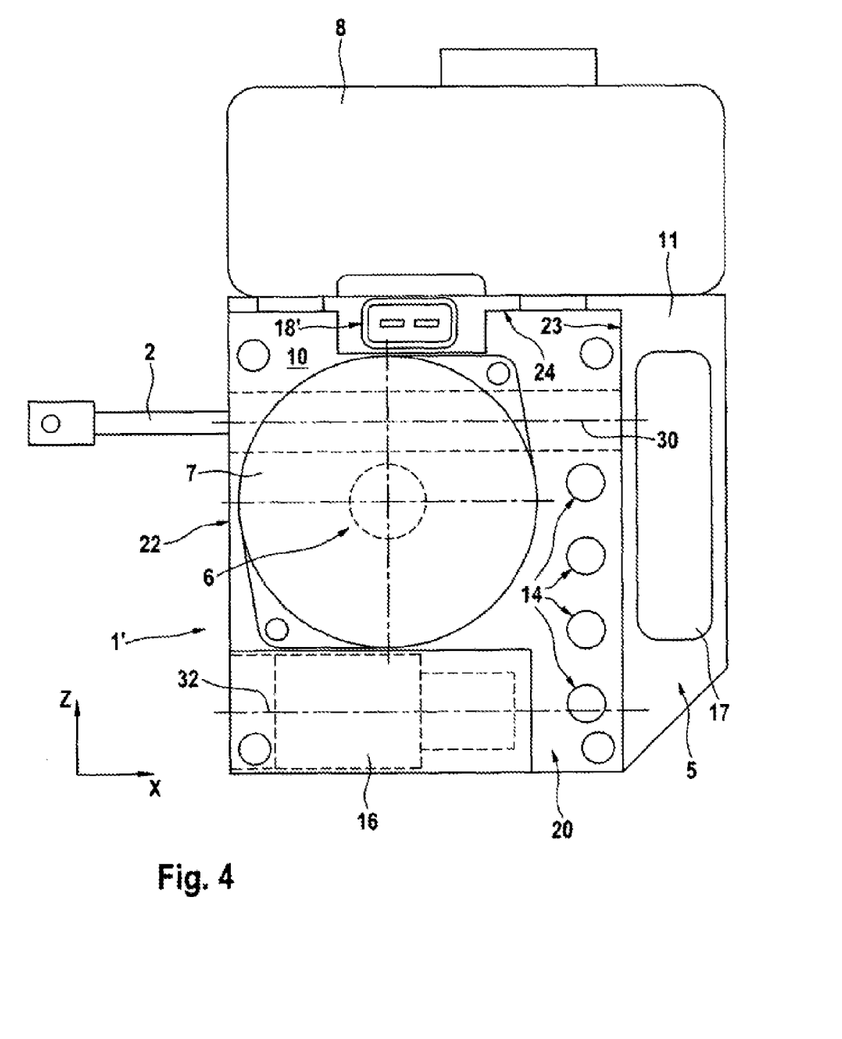
FIG. 4 shows the second exemplary embodiment of FIG. 3 in a second view perpendicular to the first view.

A second exemplary embodiment of a brake actuating unit according to the invention is represented schematically in FIGS. 3 and 4. The second exemplary embodiment corresponds very largely to the first exemplary embodiment. Thus, the brake actuating module 1' includes a first cylinder/piston arrangement 3, for example a tandem master cylinder, actuable by a push rod 2, a valve arrangement 4 comprising a plurality of valves 41, 42, 43, an electrically controllable pressure supplying device 6 with a second cylinder/piston arrangement 12, an electric motor 7 with a rotational-translational gear mechanism 9, an electronic control and regulating unit 5, a brake pedal feel simulator 16 and a pressure medium reservoir 8. The cylinder/piston arrangement 3, the valve arrangement 4 and the pressure supplying device 6 are arranged wholly or at least partially inside a single common housing 10. The axis 33 of the electric motor 7 of the pressure supplying device 6 is arranged substantially perpendicular to the longitudinal axis 30 of the first cylinder/piston arrangement 3.

The relative arrangement/orientation of first cylinder/piston arrangement 3, valve arrangement 4, pressure supplying device 6 (second cylinder/piston arrangement 12 and electric motor 7), electronic control and regulating unit 5, brake pedal feel simulator 16, hydraulic connections 14, brake actuation travel detecting device 15 and pressure medium reservoir 8 of the second exemplary embodiment also corresponds substantially to the arrangement/orientation according to the first exemplary embodiment. For example, the electric motor 7 is arranged on the lateral face 20 of the housing 10 and the control and regulating unit 5 on the opposite lateral face 21.

In the example, in deviation from the first exemplary embodiment, the control unit housing 11 extends beyond the lateral face 21 in the X direction and in the Z direction. Electrical connecting elements 17, and 18' are arranged, for example injection-molded, on the control and regulating unit 5 or on its housing 11. The arrangement of the electrical connecting element 17, which serves, for example, for connecting a data or bus connection for signal transmission to another control unit or for connection to a CAN bus, corresponds to the arrangement as in the first exemplary embodiment. The injection molded connecting element 18', which is suitable for supplying electric current to the control and regulating unit 5, is arranged in the example on the region of the control unit housing 11 projecting beyond the lateral face 21 in the Z direction and is arranged or runs between the pressure medium reservoir 8 and the housing 10 (in the direction towards the viewer in FIG. 4, parallel to the electric motor axis 33). The plug-in direction of the connecting element 18' is oriented in the direction parallel to the electric motor axis 33 (Y direction). The connecting element 18' is therefore arranged between the lateral face 24 and the brake fluid container 8, and the plug-in direction is parallel to the lateral face 24.

To allow the connecting element 18' to pass through, in the example a recess in the housing 10 and a recess in the pressure medium reservoir 8 are present.

The two-dimensional extension of the control and regulating unit 5 or of its housing 11 is somewhat larger in the example than the corresponding lateral face 21 of the housing 10, so that in FIG. 4 the control unit housing 11 arranged behind the housing 10 can be seen in a ghosted view in the region of the recess in the housing 10, between the housing 10 and pressure medium reservoir 8 and in front of the housing 10.

According to an exemplary embodiment which is not shown, the connecting element for the electric current supply, injection-molded to the control and regulating unit 5 or to its housing 11, is disposed or projects through the housing 10 or through the pressure medium reservoir 8 parallel to the electric motor axis 33. To allow the plug-in connection to pass through, a recess is provided in the housing 10 or in the reservoir 8.

While the above description constitutes the preferred embodiment of the present invention, it will be appreciated that the invention is susceptible to modification, variation, and change without departing from the proper scope and fair meaning of the accompanying claims.

The invention claimed is:

1. A brake-by-wire actuating unit for a motor vehicle brake system, comprising:
   a housing;
   a first hydraulic cylinder/piston arrangement having an actuating piston which is guided displaceably in a corresponding housing and delimits a hydraulic pressure chamber to which a plurality of wheel brakes of the motor vehicle are connectable, the actuating piston being operable by a push rod which transmits an actuating force;
   an electrically controllable pressure supplying device in the form of a second hydraulic cylinder/piston arrangement, a piston of which can be displaced by an electric motor acting through a rotational-translational gear mechanism; and a valve arrangement having a number of valves for setting wheel-individual brake pressures and for disconnecting or connecting the wheel brakes with the first cylinder/piston arrangement and with the pressure supplying device;

wherein the valve arrangement and the pressure supplying device are arranged at least partially inside the housing, an axis of the electric motor of the pressure supplying device being arranged substantially perpendicular to a longitudinal axis of the first cylinder/piston arrangement; and wherein the electric motor is arranged on a first face of the housing, and the valve arrangement is arranged on a second face of the housing that is opposite the first face, wherein the first and second faces directly face each other.

2. The brake-by-wire actuating unit as claimed in claim 1 further comprising a brake pedal feel simulator arranged at least partially in the housing, a longitudinal axis of the brake pedal feel simulator being arranged substantially perpendicular to a longitudinal axis of the second cylinder/piston arrangement and being arranged offset from the longitudinal axis of the first cylinder/piston arrangement.

3. The brake-by-wire actuating unit as claimed in claim 1 further comprising the electric motor and hydraulic connections of the brake actuating unit, for connecting the wheel brakes, are arranged on the first face of the housing, the first face being a first lateral face of the housing.

4. The brake-by-wire actuating unit as claimed in claim 3 wherein the electronic control and regulating unit includes a control unit housing that is arranged on the second face of the housing, the second face being a second lateral face of the housing opposite the electric motor, the control unit housing extending beyond the second lateral face in at least one direction and, the control unit housing covering at least a portion of the valve arrangement and a brake pedal actuation travel detecting device or a pressure sensor.

5. The brake-by-wire actuating unit as claimed in claim 4, further comprising at least one electrical connecting element is arranged on the control unit housing, the electrical connecting element extending parallel to the axis of the electric motor, adjacently to a third lateral face of the housing opposite the push rod.

6. The brake-by-wire actuating unit as claimed in claim 4 further comprising an electrical connecting element for supplying electrical energy to the electronic control and regulating unit, is arranged on the control unit housing and extends through the housing or between the housing and the pressure medium reservoir or through a pressure medium reservoir, the electrical connecting element being aligned parallel to the axis of the electric motor.

7. The brake-by-wire actuating unit as claimed in claim 4 further comprising the second hydraulic cylinder/piston arrangement of the pressure supplying device projects at least partially from the housing, the second hydraulic cylinder/piston arrangement being covered by the control unit housing or extending through the control unit housing.

8. The brake-by-wire actuating unit as claimed in claim 1 further comprising a brake pedal actuation travel detecting device is integrated at least partially in the housing, the brake pedal actuation travel detecting device detecting the travel of the actuating piston.

9. The brake-by-wire actuating unit as claimed in claim 1 further comprising a first pressure sensor which detects the pressure of a hydraulic medium in the first cylinder/piston arrangement, and a second pressure sensor which detects the pressure of the hydraulic medium in the pressure supplying device, wherein the first and the second pressure sensors are integrated at least partially in the housing.

10. The brake-by-wire actuating unit as claimed in claim 1 wherein the electric motor is fastened directly to a first lateral face of the housing, the axis of the electric motor being arranged substantially perpendicular to the first lateral face and the size of the first lateral face enabling the electric motor to be sealed to the housing.

11. The brake-by-wire actuating unit as claimed in claim 1 wherein the first face of the housing is a first lateral face, and the electric motor is arranged on the first lateral face, and the second face of the housing is a second lateral face, and the valve arrangement is arranged on the second lateral face of the housing opposite the electric motor, wherein the first and second lateral faces directly face each other.

12. The brake-by-wire actuating unit as claimed in claim 1 wherein a pressure medium reservoir under atmospheric pressure is arranged directly on a fourth lateral face of the housing, or a hydraulic connection for a pressure medium reservoir under atmospheric pressure is arranged on the fourth lateral face of the housing.

13. The brake-by-wire actuating unit as claimed in claim 1 further comprising the housing includes on a fifth lateral face on the push-rod side a fastening plate, by means of which the housing can be fastened mechanically to a bulkhead of the motor vehicle.

14. A brake system for motor vehicles which, in a brake-by-wire mode, can be activated both by the vehicle driver and independently of the vehicle driver, is normally operated in the brake-by-wire mode and can be operated in at least one fall-back mode in which only operation by the vehicle driver is possible, which brake system has a brake actuating unit as claimed in claim 1 and further comprising a brake pedal for actuating the brake actuating unit.

15. The brake-by-wire actuating unit as claimed in claim 1 wherein the longitudinal axis of the first cylinder/piston arrangement is generally parallel with the longitudinal axis of the motor vehicle.

16. The brake-by-wire actuating unit of claim 1, wherein a longitudinal axis of the electric motor and a longitudinal axis of the second cylinder/piston arrangement are arranged in alignment.

17. A brake-by-wire actuating unit for a motor vehicle brake system, comprising:

a housing;

a first hydraulic cylinder/piston arrangement having an actuating piston which is guided displaceably in a corresponding housing and delimits a hydraulic pressure chamber to which a plurality of wheel brakes of the motor vehicle are connectable, the actuating piston being operable by a push rod which transmits an actuating force;

an electrically controllable pressure supplying device in the form of a second hydraulic cylinder/piston arrangement, a piston of which can be displaced by an electric motor acting through a rotational-translational gear mechanism;

a valve arrangement having a number of valves for setting wheel-individual brake pressures and for disconnecting or connecting the wheel brakes with the first cylinder/piston arrangement and with the pressure supplying device;

wherein an axis of the electric motor of the pressure supplying device is arranged substantially perpendicular to a longitudinal axis of the first cylinder/piston arrangement, and the electric motor and hydraulic connections of the brake actuating unit, for connecting the wheel brakes, are arranged on a first lateral face of the housing;

wherein the valve arrangement and the pressure supplying device are arranged at least partially inside the housing and on a second lateral face of the housing opposite the electric motor, the first and second lateral faces directly facing each other; and wherein at least one electrical connecting element is arranged on the housing, the electrical connecting element extending parallel to the axis of the electric motor, the electrical connecting element being adjacent to a third lateral face of the housing and opposite the push rod.

18. The brake-by-wire actuating unit as claimed in claim 17 wherein the longitudinal axis of the first cylinder/piston arrangement is generally parallel with a longitudinal axis of the motor vehicle.

19. The brake-by-wire actuating unit as claimed in claim 17 further comprising a brake pedal feel simulator arranged at least partially in the housing, a longitudinal axis of the brake pedal feel simulator being arranged substantially perpendicular to a longitudinal axis of the second cylinder/piston arrangement.

20. A brake-by-wire actuating unit for a motor vehicle brake system, comprising:
a housing;
a first hydraulic cylinder/piston arrangement having an actuating piston which is guided displaceably in a corresponding housing and delimits a hydraulic pressure chamber to which a plurality of wheel brakes of the motor vehicle are connectable, the actuating piston being operable by a push rod which transmits an actuating force;
an electrically controllable pressure supplying device in the form of a second hydraulic cylinder/piston arrangement, a piston of which can be displaced by an electric motor acting through a rotational-translational gear mechanism;
a valve arrangement having a number of valves for setting wheel-individual brake pressures and for disconnecting or connecting the wheel brakes with the first cylinder/piston arrangement and with the pressure supplying device;
wherein the valve arrangement and the pressure supplying device are arranged at least partially inside the housing, an axis of the electric motor of the pressure supplying device being arranged substantially perpendicular to a longitudinal axis of the first cylinder/piston arrangement; and
wherein the electric motor is arranged on a first face, and a pressure medium reservoir under atmospheric pressure or a hydraulic connection for a pressure medium reservoir under atmospheric pressure is arranged on a second face that is substantially perpendicular to the first face.

21. The brake-by-wire actuating unit of claim 20, wherein the pressure medium reservoir or the hydraulic connection for a pressure medium reservoir is arranged on the second face that is perpendicular to the first face, the electric motor is arranged on the first face, and the push rod is arranged on a third face, the third face being perpendicular to the first face and further being perpendicular to the second face, such that the first, second, and third faces are each perpendicular to each other.

* * * * *